United States Patent
Hosein

(10) Patent No.: US 7,466,669 B2
(45) Date of Patent: Dec. 16, 2008

(54) REVERSE LINK SCHEDULER FOR CDMA NETWORKS

(75) Inventor: Patrick A. Hosein, San Diego, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1095 days.

(21) Appl. No.: 10/713,763

(22) Filed: Nov. 14, 2003

(65) Prior Publication Data

US 2005/0107090 A1    May 19, 2005

(51) Int. Cl.
    *H04B 7/00* (2006.01)
(52) U.S. Cl. ...................................... 370/310
(58) Field of Classification Search ......... 370/229–232, 370/235, 310, 328, 342, 464, 468, 479; 455/422, 455/435, 450–454
    See application file for complete search history.

(56) References Cited

U.S. PATENT DOCUMENTS

| | | | | |
|---|---|---|---|---|
| 5,675,629 A | * | 10/1997 | Raffel et al. | 455/552.1 |
| 5,914,950 A | * | 6/1999 | Tiedemann et al. | 370/348 |
| 5,923,650 A | * | 7/1999 | Chen et al. | 370/331 |
| 6,101,176 A | * | 8/2000 | Honkasalo et al. | 370/335 |
| 6,208,873 B1 | * | 3/2001 | Black et al. | 455/522 |
| 6,999,425 B2 | * | 2/2006 | Cheng et al. | 370/252 |
| 7,031,254 B2 | * | 4/2006 | Abraham et al. | 370/229 |
| 7,031,741 B2 | * | 4/2006 | Lee et al. | 455/522 |
| 2005/0037796 A1 | * | 2/2005 | Tsai et al. | 455/522 |

\* cited by examiner

*Primary Examiner*—Dmitry Levitan
(74) *Attorney, Agent, or Firm*—Coats & Bennett, P.L.L.C.

(57) ABSTRACT

A base station (BS) is configured to support a plurality of mobile stations on the reverse link by selectively designating one or more of them as members in a rate-controlled set. Members follow the common rate control commands broadcast by the BS, while non-members do not. The non-members preferably fall back to a minimum data rate. Set members each provide feedback to the BS indicating whether the member is "mobile-limited" wherein it cannot increase its reverse link data rate even if commanded to do so by the BS, or whether the member is "command-limited" wherein the member could increase its data rate but is not permitted to do so by the BS. The BS dynamically adjusts membership in the set to maintain a balance between having too many mobile-limited or command-limited members, since either condition is inefficient. The BS also may adjust membership by attempting to equalize membership times in the set.

54 Claims, 5 Drawing Sheets

REVERSE LINK SCHEDULER FOR CDMA NETWORKS

BACKGROUND OF THE INVENTION

The present invention generally relates to wireless communication networks, and particularly relates to reverse link load management in such networks.

Wireless networks based on Code Division Multiple Access (CDMA) technology are termed "interference limited" networks because the number of users that can be simultaneously supported is limited by the prevailing interference. This limitation particularly applies to the "reverse link" from the mobile stations to a network Base Station (BS). The BS must receive each mobile station's reverse link signals at a sufficient Signal-to-Noise (SNR) for reliable decoding and thus the BS commands individual mobile stations to increase or decrease their transmit powers to maintain the targeted SNRs. However, the available transmit power at each mobile station is relatively limited, and, because each mobile station's transmit power contributes to overall interference, the BS must control the transmit powers of all mobile stations to maintain overall interference at tolerable levels.

In networks that support variable data rates on the reverse link, the level of reverse link interference can be managed at least in part by adjusting the data rates of the individual mobile stations upward or downward, which results in commensurate increases or decreases in the transmit power required from each mobile station to achieve the targeted received signal quality at the BS. The reverse packet data channels (R-PDCHs) defined in the developing IS-2000 standards exemplify the type of reverse link rate-controlled channels that may be adjusted as a function of reverse link loading (interference).

One approach to such adjustment is termed Common Rate Control (CRC), wherein the BS broadcasts rate control commands that are followed by the plurality of mobile stations being served by that BS. The rate control commands typically are broadcast on a per frame basis, which may be every 10 ms, every 20 ms, or at whatever value corresponds to the defined reverse link frame timing. One characteristic of the CRCs is that they do not set specific reverse link data rates at each mobile station, but rather provide generally applicable up, down, or, in some networks, hold indications to be followed by the mobile stations. Thus, different mobile stations operating at different reverse link data rates would each drop to the next lower rate relative to the current rate in response to receiving a generally broadcast down command, or would each step up to the next higher rate relative to the current rate in response to receiving a generally broadcast up command.

With the CRC-based approach, then, the BS commands the mobile stations it is supporting to move their reverse link data rates incrementally up and down as needed responsive to changing reverse link loading levels. However, this common rate control approach does not address the desire of network operators to pursue particular service objectives, such as fairness or throughput-based objectives, nor does it necessarily achieve effective utilization of the available reverse link capacity.

SUMMARY OF THE INVENTION

The present invention comprises a method and apparatus to manage loading of a reverse link in a wireless communication network. According to an exemplary embodiment of the present invention, the method comprises serving a plurality of mobile stations on the reverse link, including mobile stations that are members of a first set of mobile stations that are allowed to adjust their reverse link data rates responsive to common rate control commands being broadcast by the network, receiving feedback from each mobile station in the first set indicating whether the reverse link data rate of the mobile station is mobile-limited or is command-limited, adding one or more new members to the first set if the reverse link data rates of more than a defined fraction of mobile stations in the first set are mobile-limited, and subtracting one or more current members from the first set if the reverse link data rates of more than a defined fraction of mobile stations are command-limited. In some embodiments, the remaining mobile stations in the plurality, i.e., those not currently in the first set, are permitted to transmit on the reverse link at no higher than some minimum or "autonomous" data rate.

In the above method, receiving feedback from the mobile stations in the first set can comprise receiving status indicators from each mobile station, wherein the status indicator takes on a first value, e.g., a logical "0," if the reverse link data rate of the mobile station is command-limited, and takes on a second value, e.g., a logical "1," if the reverse link data rate of the mobile station is mobile-limited. In this context, mobile-limited means that the mobile station cannot further increase its reverse link data rate even if commanded to do so by the network via the rate control commands. Conversely, being command-limited means that the mobile station could increase its reverse link data rate if permitted to do so by the network. If a large percentage of mobile stations currently in the first set are command-limited, the base station subtracts one or more members from the first set to reduce reverse link interference. If a large percentage of mobile stations currently in the first set are mobile-limited, then the base station's ability to increase reverse link loading by commanding rate increases is compromised and it thus adds one or more new members to the first set (with the assumption that new members can be commanded upward from the autonomous rate).

Thus, an exemplary base station manages loading of a reverse link in a wireless communication network by assigning selected ones in a plurality of mobile stations as members in a set of rate-controlled mobile stations, broadcasting rate control commands to adjust reverse link data rates of the rate-controlled mobile stations and thereby affect reverse link loading by the rate-controlled mobile stations, and adjusting membership in the set of rate-controlled mobile stations if a targeted reverse link loading cannot be substantially maintained by broadcasting the rate control commands. In adjusting membership in the rate-controlled set, the base station sends assignment messages to one or more currently unassigned mobile stations to add members to the set, and sends un-assignment messages to one or more currently assigned mobile stations to subtract members from the set.

The base station may assign selected ones in a plurality of mobile stations as members in a set of rate-controlled mobile stations by determining a minimum number of mobile stations to achieve the targeted reverse link loading and thereby minimize the number of mobile stations simultaneously transmitting on the reverse link. However, the base station also may be configured to operate according to a fairness goal wherein it adjusts membership in the set of rate-controlled mobile stations based on a fairness goal, which may comprise equalizing membership times in the set of rate-controlled mobile stations for all mobile stations in the plurality of mobile stations.

Accordingly, an exemplary base station comprises transceiver circuits to send signals to a plurality of mobile stations on a forward link and receive signals from the mobile stations on a reverse link, processing logic including a load controller configured to generate rate control commands for a first set of mobile stations in the plurality of mobile stations based on a reverse link loading, and further configured to receive feedback from each mobile station in the first set indicating whether the reverse link data rate of the mobile station is mobile-limited or is command-limited, add one or more new members to the first set if the reverse link data rates of more than a defined fraction of mobile stations in the first set are mobile-limited, and subtract one or more current members from the first set if the reverse link data rates of more than a defined fraction of mobile stations are command-limited. Such processing logic may be implemented in hardware, software, or some combination thereof. In an exemplary embodiment, the processing logic comprises one or more microprocessors or other processing logic, and the load controller is at least partially implemented as computer program instructions stored in a computer readable medium for execution by the base station processing logic.

Complementing the above operations, an exemplary method of mobile station operation comprises responding to the rate control commands if in a first mode, not responding to the rate control commands if in second mode, and operating in the first mode or the second mode according to an indication received from the network. Thus, the exemplary base station can designate individual mobile stations as members or non-members of the rate-controlled set based on sending signaling messages to the mobile stations. If in the first mode, the mobile station responds to the rate control commands by increasing, decreasing, or maintaining its reverse link data rate according to the particular rate control commands received. If in the second mode, the mobile station does not respond to the rate control command and, instead, maintains its reverse link data rate at or below a defined autonomous reverse link rate limit. Thus, the network may define a maximum data rate that non-member mobile stations are permitted to transmit at on the reverse link.

Further, the exemplary mobile station transmits status indicators to the network to indicate whether the mobile station is mobile-limited, meaning that it cannot increase its data rate because of one or more conditions at the mobile station, or is command-limited, meaning that it could increase its reverse link data rate but for the common rate control commands indicating that it should not. Thus, the exemplary mobile station provides feedback to the network that the base station can use in determining whether to add or subtract mobile stations to or from the rate-controlled set. The mobile station may be configured to provide such feedback if it is designated as a member of the rate-controlled set.

The present invention is applicable to reverse link rate control in a variety of wireless communication network types. For example, it may be applied to the rate-controlled reverse link packet data channels defined in the developing IS-2000 standards, e.g., the Reverse Packet Data Channels (R-PDCHs) defined in Release D of the IS-2000 standard. However, those skilled in the art will appreciate the present invention's broader applicability and, further, will recognize additional features and advantages in light of the following detailed discussion and the accompanying figures.

DETAILED DESCRIPTION OF THE INVENTION

Figure 1:
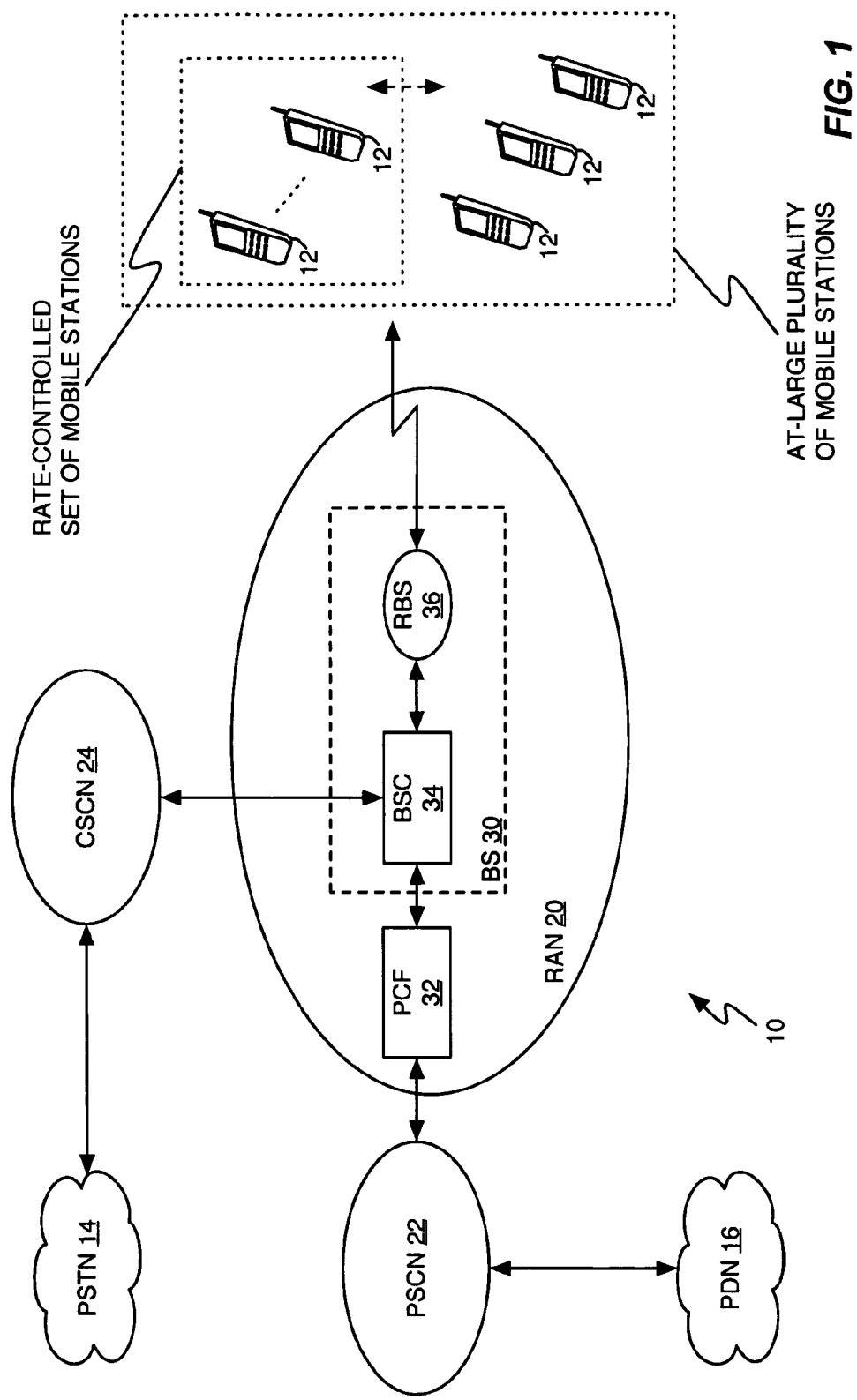
FIG. 1 is a diagram of an exemplary wireless communication network according to the present invention.

FIG. 1 illustrates an exemplary wireless communication network 10 configured according to one or more embodiments of the present invention. Network 10 may be a cdma2000 network, for example, but the present invention is not limited to cdma2000 networks and, indeed, has applicability to a broad range of network types, including, but not limited to, WCDMA networks.

Network 10 provides wireless communication support for a plurality of mobile stations 12. For example, network 10 may communicatively couple one or more of the mobile stations 12 to users of the Public Switched Telephone Network (PSTN) 14 or to users of a Public Data Network (PDN) 16, such as the Internet or other packet data network.

Supporting such connectivity, the exemplary network 10 comprises a Radio Access Network (RAN) 20 providing wireless signaling to and from the mobile stations 12, a Packet Switched Core Network (PSCN) 22 providing packet data communication with the PDN 16, and a Circuit Switched Core Network (CSCN) 24 providing circuit-switched (e.g., voice, fax) communication with the PSTN 14. However, those skilled in the art should appreciate that the illustrated network architecture is exemplary and subject to variation as needed or desired. Indeed, embodiments based on Global System for Mobile communications (GSM) and GSM/Enhanced Data Rates for GSM (GSM/EDGE), for example, may have a different arrangement of entities. However, the present invention focuses on the RAN 20 and in particular on Base Station (BS) 30 and the details and possible variations associated with the core networks are not germane to understanding exemplary RAN operations.

In actual implementation, it should be understood that RAN 20 typically comprises a plurality of BSs 30, each providing coverage over defined service areas, but FIG. 1 depicts only one BS 30 for ease of discussion. The exemplary BS 30 includes or is associated with a Packet Control Function (PCF) 32 or other packet interface entity that provides it with packet data connectivity to PSCN 22. With this arrangement, the mobile stations 12 can establish data sessions with network 10 wherein packet data, e.g., web browsing, email, etc., is carried between them and PDN 16 via network 10. Supporting such signaling, an exemplary BS 30 comprises a Base Station Controller (BSC) 34 and one or more associated Radio Base Stations (RBSs) 36. Typically, BSC 34 controls a plurality of RBSs 36 but only one RBS 36 is illustrated for ease of discussion. Further, those skilled in the art should appreciate that the division of BS 30 into BSC and RBS entities is a matter of design choice and that the exemplary method described below in accordance with the present invention can be carried out using other base station architectures or arrangements.

In any case, RBS 36 provides wireless signaling to and from the plurality of mobile stations 12 according to the air interface standard adopted by network 10, e.g., the IS-2000 standard for third generation CDMA networks. As such, the RBS 36 transmits to the mobile stations 12 on a forward link and receives from those mobile stations 12 on a reverse link. These forward and reverse links typically comprise a plurality of channels. For example, the forward link comprises one or more forward packet data channels used to transmit packet data information to particular ones of the mobile station 12, and one or more broadcast channels used transmit control and other signaling to the at-large plurality of mobile stations.

Similarly, the RBS 36 serves the plurality of mobile stations on the reverse link by using a number of reverse link channels. In an exemplary embodiment, each mobile station 12 transmits to RBS 36 using a reverse link channel, such as a reverse link packet data channel. Thus, each mobile station 12 being served on the reverse link transmits data to the RBS 36 on an assigned reverse link channel. As an example, network 10 may be a cdma2000 network configured according to the developing IS-2000 standards, wherein high-speed packet data services are supported on the reverse link based on assigning a Reverse Packet Data Channel (R-PDCH) to each mobile station 12. With such channels, each mobile station 12 transmits data as needed at a defined data rate. Of course, the particular data rate used by each of the mobile stations 12 depends on a number of variables, such as radio conditions at the mobile station 12, and on overall base station "loading." As used herein, loading broadly refers to total received power (noise plus interference) of the RBS 36 or to the capacity utilization of one or more base station resources.

As is well understood by those skilled in the art, RBS 36 requires the signals from individual ones of the mobile stations 12 to be received at a given Signal-to-Noise Ratio (SNR) for decoding at tolerable error rates. The particular level required is data rate dependent and, in general, higher data rates require higher powers. Each mobile station 12 contributes to the overall received power at the RBS 36 and, thus, the reverse link loading at RBS 36 depends on the aggregate power of the plurality of mobile stations 12 (and on noise plus other-cell interference). Accordingly, the RBS 36 can manage reverse link loading by adjusting the reverse link data rates and, hence, reverse link powers, used by the mobile stations 12.

Figure 2:
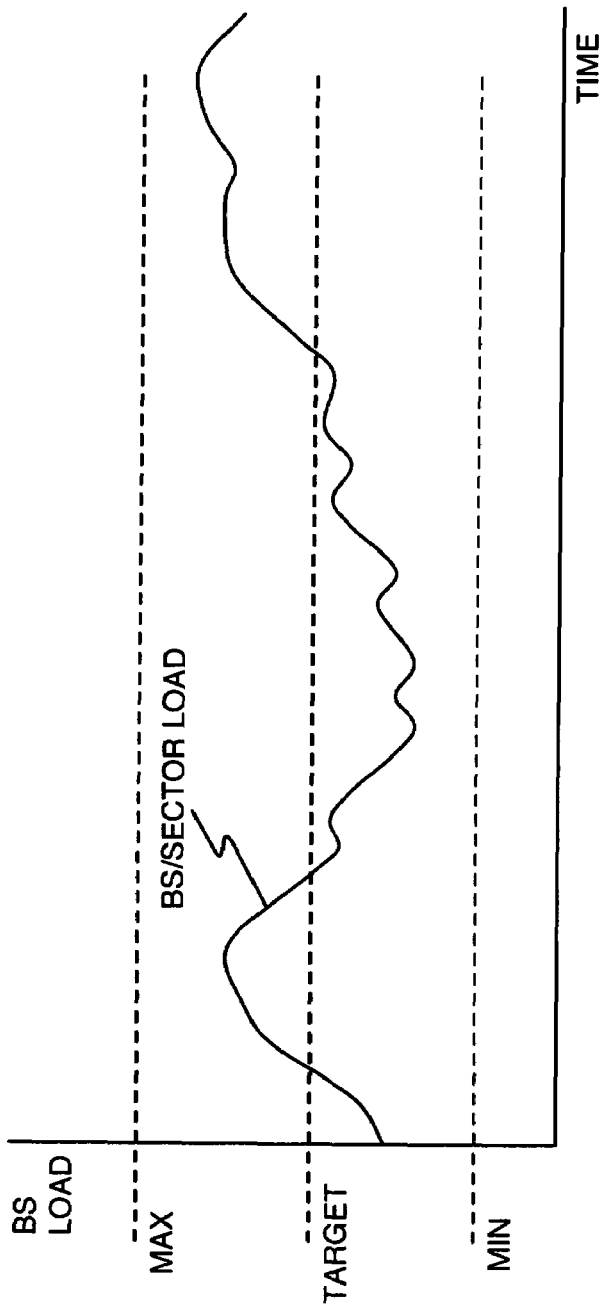
FIG. 2 is a diagram of a typical time-varying reverse link load at a wireless network base station.

In an exemplary embodiment, RBS 36 broadcasts Common Rate Control Commands, referred to herein simply as "rate control commands," as part of its reverse link load management. For example, FIG. 2 illustrates a hypothetical reverse link loading that varies over time relative to a target loading, which may be set at a level that corresponds to reasonably high link capacity utilization but that is below an "outage" level. For example, the "MAX" load level in FIG. 2 may correspond to a one percent outage probability and the target may be set at a level below the MAX according to a back-off that considers the normal range of loading fluctuations.

According to an exemplary rate control method, the RBS 36 broadcasts down commands if the load rises too far above the target level and, conversely, transmits up commands if the load falls too far below the target. In some embodiments, the RBS 36 may transmit hold commands if the load is within a defined range of the target, i.e., it may call for no reverse link rate adjustments by the mobile stations 12 if the load is fairly close to the target level. Regardless, BS 30 transmits rate control commands responsive to estimated base station loading to cause mobile stations 12 to increase, decrease, or hold their current reverse link data rates, as needed to maintain the reverse link loading at or around the targeted level. Base station load may be estimated based on Frame Erasure Rates measured at the RBS 36 or on Frame Error Rates (FERs) measured at the BSC 34 as detailed in the co-pending U.S. patent application by Hosein, et al, which is entitled "Method for Dynamically Estimating the Reverse Traffic Channel Load Estimate of a CDMA Network," and which is assigned to the same assignee of the instant application. Alternatively, base station loading may be estimated based on Rise-over-thermal (ROT) measurements, or by other methods as needed or desired.

According to an exemplary embodiment of the present invention, BS 30 is configured to select or otherwise assign particular ones of the plurality of mobile stations 12 to a subset of rate controlled mobile stations 12, referred to herein as a "Rate Controlled Set" or RCS. Mobile stations 12 in the RCS are permitted to "follow" the BS's rate control commands and thus control their reverse link data rates as a function of those commands. Mobile stations 12 not in the RCS, i.e., the remaining ones in the plurality of mobile stations 12 are not permitted to respond to the BS's rate control commands, although they may be permitted to transmit as needed on the reverse link at some minimum defined data rate, e.g., an "autonomous" data rate of 9.6 kbps.

By restricting membership in the RCS to a smaller subset of the at-large plurality of mobile stations 12 being served on the reverse link, a smaller number of mobile stations 12 ("users") transmit at data rates above the autonomous rate at any given instant. The net effect of reducing the number of users transmitting at higher data rates is a reduction in overall reverse link interference. With reduced interference, BS 30 drives the data rates of the users in the RCS upward to meet the target loading and, thus, users in the RCS tend to transmit at the highest data rates that they can support. If the RCS is populated with users in the best radio conditions, then reverse link throughput is maximized.

Figure 3:
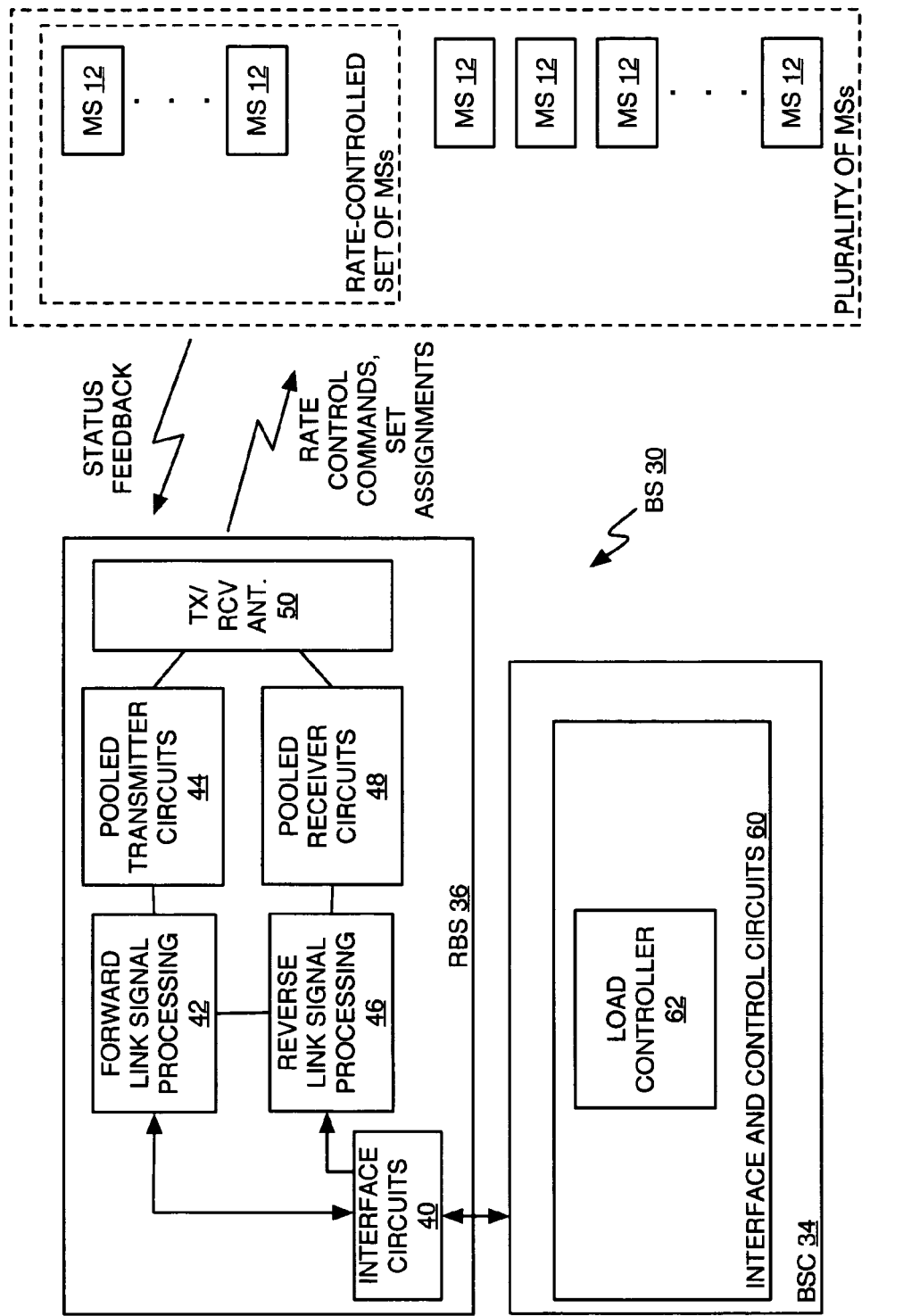
FIG. 3 is a diagram of exemplary functional details for a base station that is configured for reverse link load management according to one or more embodiments of the present invention.

Of course, membership in the RCS is not static, and BS 30 is configured to adjust RCS membership according to one or more service goals. In an exemplary embodiment, the BS 30 adjusts membership in the RCS to achieve a desired reverse link loading and, optionally, to achieve a measure of "fairness" on the reverse link. These and others are explained in the context of FIGS. 3 and 4, which illustrate exemplary BS details. In particular, FIG. 3 illustrates exemplary details for an embodiment of BS 30, wherein RBS 36 comprises interface circuits 40, forward link signal processing circuits 42, transmitter circuits 44, reverse link signal processing circuits 46, receiver circuits 48, transmit/receive antenna assemblies 50, and a load controller 60, and wherein BSC 34 comprises interface and control circuits 62. Load controller 60 provides rate control and RCS membership control according to the present invention.

Figure 4:
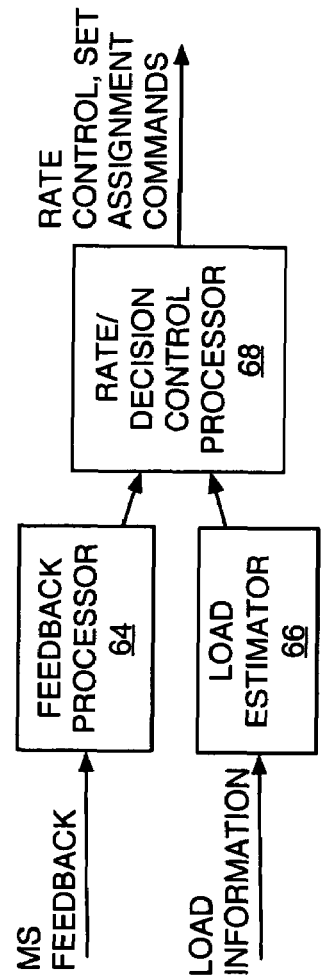
FIG. 4 is a diagram of exemplary functional details for a base station load controller.

FIG. 4 illustrates exemplary details for load controller 60, which comprises a feedback processor 64, a load estimator 66, and a rate/set decision processor 68. Load controller 60 can be implemented in hardware, software, or some combination thereof. Further, load controller 60 can be implemented either in RBS 36 or in BSC 34, and can be configured to provide exemplary reverse link load management on a per-sector basis, such that the exemplary methods described herein are implemented in each service sector of RBS 36. In an exemplary embodiment, RBS 36 comprises one or more microprocessor-based circuits and load controller 60 comprises, at least in part, computer program instructions stored in a computer readable medium, e.g., base station memory, for execution by the one or more microprocessor circuits.

Regardless of its implementation details, in an exemplary embodiment, load controller 60 is configured to manage reverse link loading by assigning selected users to the RCS, and generating rate control commands to adjust the reverse link data rates of those users according to the reverse link loading target. The rate/set decision processor 68 generates the appropriate rate control commands (up, down, etc.) for broadcast by BS 30 based on feedback from the rate-controlled mobile stations 12 as processed by feedback processor 64, and based on estimated or measured base station loading, as provided by load estimator 66.

If the reverse link capacity is underutilized, i.e., loading is below the target, load controller 60 generates "up" rate control commands to increase the reverse link loading by the rate-controlled users. Conversely, if the reverse link capacity is over-utilized, i.e., loading is over the target, load controller 60 generates "down" rate control commands to decrease the reverse link loading by the rate-controller users. As was noted, load controller 60 may generate "hold" rate control commands if loading is slightly above or below the target.

In the nominal case, then, the load controller 60 manages reverse link loading by driving the data rates of the rate-controlled users up or down as needed according to the loading target via manipulation of the rate control commands being broadcast from BS 30. However, conditions may be such that load controller 60 cannot effectively manage reverse link loading/usage simply by manipulation of the rate control commands. Load controller 60 monitors the aforementioned feedback from the rate-controlled users to identify such conditions. In general, load controller 60 processes the feedback to determine whether an undesirably large percentage of members in the RCS, i.e., rate-controlled mobile stations 12, are "command-limited" or whether an undesirably large percentage of them are "mobile-limited." In either such instance, the load controller 60 adjusts the composition of the RCS, i.e., it adjusts the membership of the RCS, to move loading further toward the target and/or to ensure effective capacity utilization of the reverse link by the members in the RCS.

The feedback from each mobile station 12 in the RCS indicates whether the reverse link data rate of the mobile station 12 is "command-limited" or "mobile-limited." A rate-controlled mobile station 12 is command-limited if it could raise its reverse link data rate but is not permitted to do so by the BS 30. A member of the RCS, i.e., a rate-controlled mobile station 12, is mobile-limited if it is permitted to increase its reverse-link data rate but cannot do so because of one or more mobile-specific conditions. For example, the mobile station 12 may lack the additional transmit power required to transmit at any higher data rate, it may not have any (or enough) data to transmit at the higher rate, or it already may be using the maximum data rate.

Because reverse link throughput tends to be maximized by minimizing the number of rate-controlled mobile stations 12 and driving their reverse link data rates upward to achieve the targeted reverse link loading, too many mobile-limited members in the RCS prevent effective utilization of the reverse link because too few of the members can respond to up commands from the BS 30. Similarly, too many command-limited members in the RCS prevent effective reverse link utilization because the interference is keeping the reverse link rates of too many members below the rates that otherwise could be achieved.

In an exemplary embodiment, each mobile station 12 is configured to transmit status indicators periodically to network 10 if it is assigned to the RCS. For example, each mobile station 12 can be configured to send a first value of status indicator if its reverse link data rate currently is command-limited and to send a second value of status indicator if its reverse link data rate currently is mobile-limited. For example, the mobile station 12 returns a logical "0" responsive to receiving a down rate control command if it could have increased its reverse link data rate, and returns a logical "1" responsive to receiving an up command if it cannot increase its reverse link data rate.

Thus, at each feedback interval, feedback processor 64 receives status indicators from the set of rate-controlled mobile stations 12 that can be processed to determine the balance of mobile-limited versus command-limited members in the RCS. An exemplary method of processing the status indicators comprises determining an average value of the returned status indicators. For example, if half the members are command-limited (status indicator=0) and half the members are mobile-limited (status indicator=1), then the average of the returned status indicators equals 0.5. Variations from this balance point are indicated by average values above or below the balance point. For example, if all members were command-limited, the average value would be zero and, conversely, if all members were mobile-limited, the average value would be one.

Figure 5:
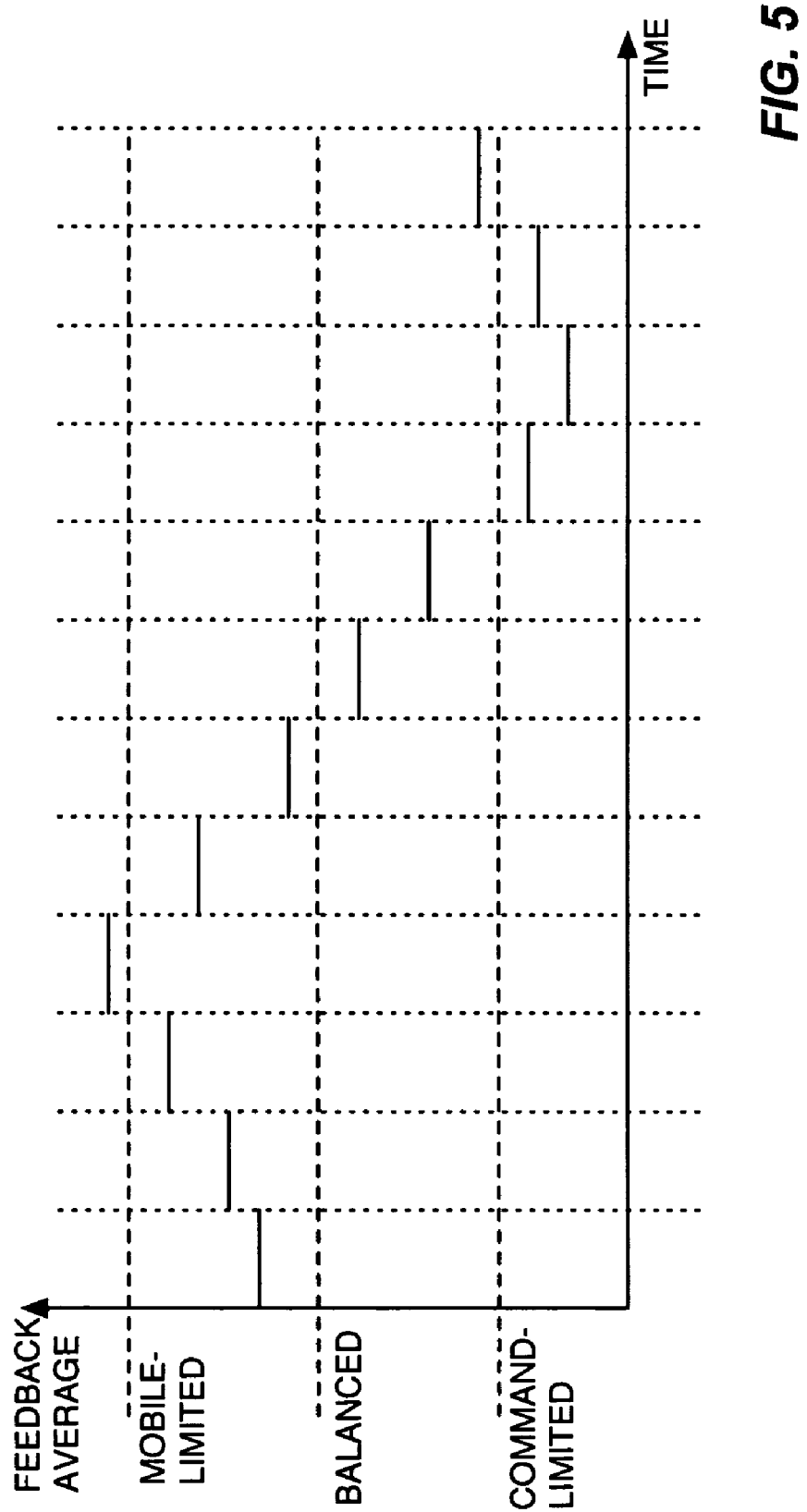
FIG. 5 is a diagram of a typical time-varying balance between command-limited and mobile-limited set members.

FIG. 5 illustrates a hypothetical variation in the average status indicator value over a number of reporting periods, wherein the average moves above and below the balance point because of changing conditions (i.e., changing levels of same-cell and outer-cell interference at BS 30, and changing radio conditions at the mobile stations 12). The average value may be tracked against defined maximum and minimum thresholds. For example, the maximum threshold may be set at a level representing an undesirably high percentage of mobile-limited members in the RCS (i.e., the average status indicator value is approaching 1), and the minimum threshold may be set at a level representing an undesirably high percentage of command-limited members in the RCS (i.e., the average status indicator value is approaching 0).

Figure 6:
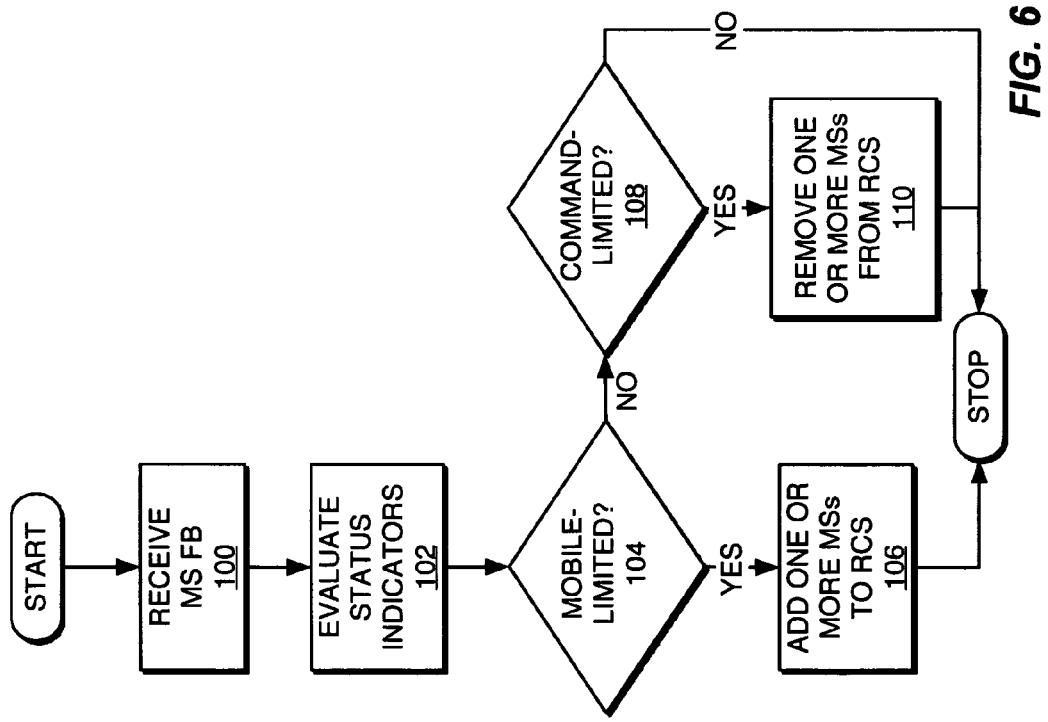
FIG. 6 is a diagram of exemplary processing logic to implement an exemplary embodiment of the present invention.

FIG. 6 illustrates exemplary logic for detecting and responding to imbalance conditions. Processing begins with the receipt of mobile station status indicators (Step 100). Feedback processor 64 evaluates the status indicators, such as by averaging them (Step 102), and determines whether a too-large percentage of mobile stations 12 in the RCS are mobile-limited (Step 104). If so, the load controller 60 adjusts membership in the RCS by adding one or more mobile stations 12 not already in the RCS as new members (Step 106). On the other hand, if the number of mobile-limited members in the RCS is below the defined adjustment threshold, the feedback processor 64 determines whether a too-large percentage of mobile stations 12 in the RCS are command-limited (Step 108). If so, load controller 60 removes one or more current members from the RCS (Step 110).

In determining the initial composition of members, and in adding or removing members according to the above logic, the load controller 60 may rank mobile stations 12 according to one or more throughput metrics, such as initial data rate, average past throughput, etc. In an exemplary embodiment, the load controller 60 is configured to generate and maintain the RCS in a manner that favors a smaller membership at higher data rates. That is, the load controller 60 tries to fully exploit the available reverse link capacity with as few members in the RCS as possible. Of course, the load controller may be configured according to other service objectives.

Indeed, in an exemplary embodiment, the load controller 60 is configured to overlay a fairness objective on its underlying throughput objective. That is, load controller 60 works to maintain a smaller number of high-data rate members in the RCS but works toward an overall reverse link service fairness by trying to equalize each mobile station's membership time in the RCS.

Figure 7:
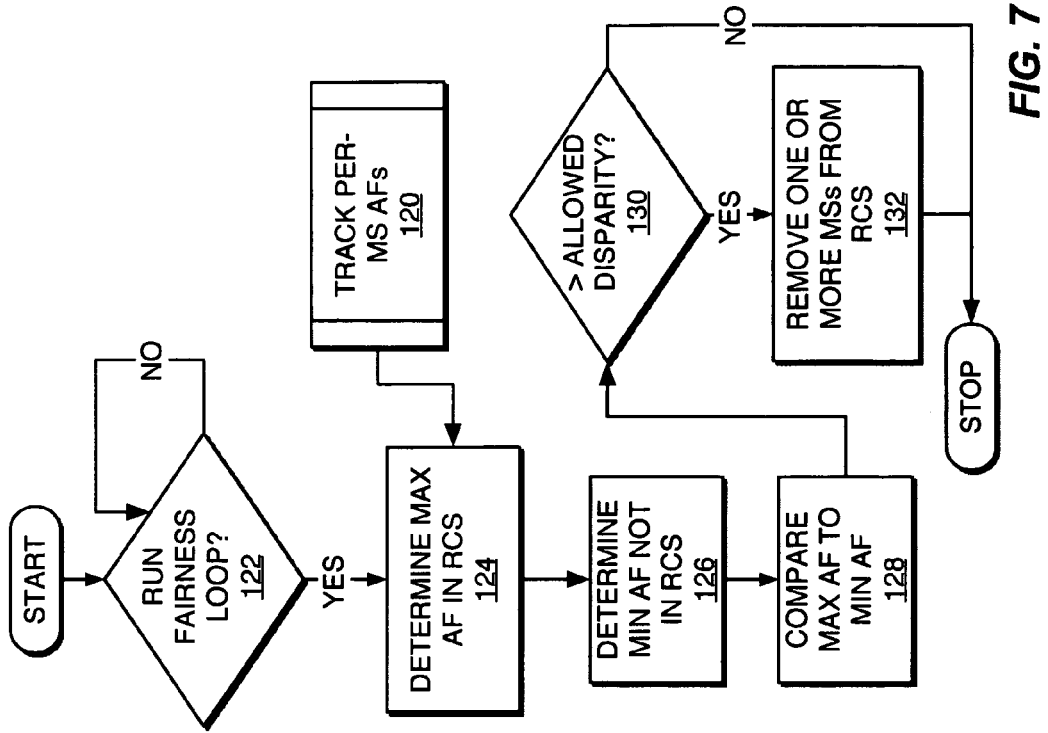
FIG. 7 is a diagram of exemplary processing logic to implement another exemplary embodiment of the present invention.

FIG. 7 illustrates such processing, which begins with the assumption that the load controller 60 maintains an "activity factor" for each mobile station 12 in the at-large plurality that indicates the cumulative membership time of the mobile station 12 in the RCS (Step 120). In an exemplary embodiment, the fairness loop processing runs at a slower rate than the dynamic command/mobile-limited balance processing described above, which may be performed by the BS 30 every frame. For example, the fairness processing loop may be run every twenty-five frames, or at some other desired interval. If it is time to run the fairness processing (Step 122), the load controller 60 determines the maximum activity factor among the mobile stations 12 that currently are assigned to the RCS (Step 124) and determines the minimum activity factor among the mobile stations that currently are not assigned to the RCS (Step 126).

It then compares these maximum and minimum activity factors, such as by calculating the max-to-min ratio, and determines whether the max-to-min disparity is greater than a defined threshold (Step 130). For example, the load controller 60 may be configured to deem max-to-min ratios above a certain value (e.g., 3, 4, or whatever) to be indicative of excess unfairness. Detection of such unfairness triggers the load controller to adjust members in the RCS by subtracting one or more current members from the RCS and replacing them with one or more new members, where the new members are selected from the plurality of mobile stations 12 currently not assigned to the RCS (Step 132).

In an exemplary embodiment, the load controller 60 at least removes the mobile station 12 corresponding to the maximum activity factor from the RCS, and adds the mobile station corresponding to the minimum activity factor to the RCS, although it may make additional membership changes as needed or desired. More generally, the load controller 60 dynamically adjusts the membership in the RCS to equalize the activity factors of all mobile stations 12 in the plurality. Thus, a mobile station 12 moved into the RCS begins responding to the rate control commands and tends to be driven upward in data rate, thereby increasing throughput on the reverse link from that mobile station 12. Conversely, a mobile station removed from the RCS stops responding to the rate control commands and, preferably, drops back to the minimum (autonomous) reverse link data rate, wherein it represents a minimal source of reverse link interference.

Activity factors may be used to support additional or alternative membership control. For example, different subscriber classes may be associated with different activity thresholds, i.e., with differing membership priorities regarding the RCS. Thus, mobile stations 12 associated with premium class users may be associated with a higher targeted activity factor than mobile stations 12 associated with a non-premium user class. By way of non-limiting example, there may be gold, silver, and bronze user classes defined in order of decreasing preference. Each class could be associated with a different target activity factor, and load controller 60 may be configured to control membership in the RCS such that all users in each class have substantially equal activity factors but such that gold users generally have higher activity factors than silver users, and so on.

Further, load controller 60 may be configured to schedule membership in the RCS based on Quality-of-Service (QoS) or other performance considerations. For example, load controller 60 may be configured to move an incoming, newly admitted mobile station 12 into the RCS quickly if it is associated with a high QoS requirement. Additionally, once admitted, load controller 60 may evaluate the activity factors of some or all the mobile stations 12 in consideration of their associated QoS requirements. Thus, load controller 60 could give scheduling preference to high QoS mobile stations 12 by increasing the activity factor target for such mobile stations.

Additionally, activity factor information may be used in admission control. For example, generally low activity factors result where there is congestion. Thus, if the activity factors of some or all of the mobile stations 12 are low, e.g., below some lower threshold, then new user admissions may be modified such that new users are deferred, blocked, or a reduced number of them are admitted.

In support of these and other scheduling variations for the RCS, in general, the BS 30 initially populates and subsequently changes membership in the RCS based on sending assignment messages targeted to individual ones of the mobile stations 12. Thus, a non-member mobile station 12 is changed to a member mobile station 12 based on sending it an assignment message indicating that change in membership status. Similarly, a member mobile station 12 is changed to a non-member mobile station 12 by sending it the appropriate assignment message. Thus, load controller 60 manages the size and particular composition of the RCS based on sending assignment messages to particular ones of the mobile stations 12 in the plurality of mobile stations 12.

With this method of dynamically adjusting membership in the RCS, the load controller 60 can be configured to pursue essentially any desired service objective or objectives, such as the throughput and fairness objectives described above. It should be understood that these objectives may be varied as needed or desired and that other variations are possible. For example, the status indicators transmitted by the mobile stations 12 may be configured to have other than 1 or 0 values. For example, their values may span a range of values. As such, the present invention is not limited to the foregoing exemplary details, but rather is limited only by the following claims and their reasonable equivalents.

What is claimed is:

1. A method of managing loading of a reverse link in a wireless communication network, the method comprising:
serving a plurality of mobile stations on the reverse link, including mobile stations that are members of a first set of mobile stations that are allowed to adjust their reverse link data rates responsive to common rate control commands being broadcast by the network;
receiving feedback from each mobile station in the first set indicating whether the reverse link data rate of the mobile station is mobile-limited or is command-limited;
adding one or more new members to the first set if the reverse link data rates of more than a first threshold percentage of mobile stations in the first set are mobile-limited; and
subtracting one or more current members from the first set if the reverse link data rates of more than a second threshold percentage of mobile stations are command-limited.

2. The method of claim 1, further comprising maintaining an activity factor for each mobile station in the plurality of mobile stations that indicates its membership time in the first set, and selectively adjusting membership in the first set based on a goal of equalizing the activity factors.

3. The method of claim 2, wherein selectively adjusting membership in the first set based on a goal of equalizing the activity factors comprises selecting particular ones of the mobile stations for movement out of the first set by ranking mobile stations in the first set according to their activity factors and moving one or more highest ranked ones of them out of the first set.

4. The method of claim 2, wherein selectively adjusting membership in the first set based on a goal of equalizing the activity factors comprises selecting particular ones of the mobile stations for movement into the first set by ranking mobile stations currently not in the first set according to their activity factors and moving one or more lowest ranked ones of them into the first set.

5. The method of claim 2, wherein selectively adjusting membership in the first set based on a goal of equalizing the activity factors comprises:
periodically comparing a maximum one of the activity factors for mobile stations in the first set to a minimum one of the activity factors for mobile stations not in the first set; and
if the comparison indicates a greater than desired disparity in activity factors, removing the mobile station having the highest activity factor from the first set, and adding the mobile station having the lowest activity factor to the first set.

6. The method of claim 1, further comprising switching one or more mobile stations in the first set with one or more mobile stations not in the first set based on a goal of equalizing an amount of membership time in the first set for all mobile stations.

7. The method of claim 1, wherein serving a plurality of mobile stations on the reverse link comprises maintaining a data session for each of the plurality of mobile stations.

8. The method of claim 1, wherein receiving feedback from each mobile station in the first set indicating whether the reverse link data rate of the mobile station is mobile-limited or is command-limited comprises receiving a status indicator from the mobile station that has a first defined value if the reverse link data rate is mobile-limited, and that has a second defined value if the reverse link data rate is command-limited.

9. The method of claim 8, wherein adding one or more new members to the first set if the reverse link data rates of more than a defined fraction of mobile stations in the first set are mobile-limited comprises adding one or more new members to the first set if an average of the status indicators indicates that the reverse link data rates of a high percentage of mobile stations in the first set are mobile-limited.

10. The method of claim 8, wherein subtracting one or more current members from the first set if the reverse link data rates of more than a defined fraction of mobile stations in the first set are command-limited comprises subtracting one or more new members from the first set if an average of the status indicators indicates that the reverse link data rates of a high percentage of mobile stations in the first set are command-limited.

11. The method of claim 8, wherein receiving a status indicator from the mobile station that has a first defined value if the reverse link data rate is mobile-limited, and that has a second defined value if the reverse link data rate is command-limited comprises receiving a logical "1" value to indicate a mobile-limited status and a logical "0" value to indicate a command-limited status.

12. The method of claim 1, further comprising maintaining an activity factor for each mobile station in the plurality of mobile stations that indicates its membership time in the first set.

13. The method of claim 12, further comprising controlling membership in the first set based on maintaining the activity factor of each mobile station substantially at a target value determined by a user class designation of the mobile station.

14. The method of claim 12, further comprising controlling membership in the first set based on maintaining the activity factors of one or more mobile stations at one or more target values determined by Quality-of-Service (QoS) constraints associated with the one or more mobile stations.

15. The method of claim 12, further comprising controlling admissions of new mobile stations to the plurality of mobile stations based on the activity factors.

16. The method of claim 15, wherein controlling admissions of new mobile stations to the plurality of mobile stations based on the activity factors comprises blocking or deferring new mobile stations from admission if an average of the activity factors of the plurality of mobile stations is below a defined threshold.

17. The method of claim 1, further comprising adjusting membership in the first set based on Quality-of-Service (QoS) constraints associated with one or more of the mobile stations.

18. A method of managing loading of a reverse link in a wireless communication network, the method comprising:
assigning selected ones in a plurality of mobile stations as members in a set of rate- controlled mobile stations;
broadcasting common rate control commands to adjust reverse link data rates of the rate-controlled mobile stations and thereby affect reverse link loading by the rate-controlled mobile stations;
adjusting membership in the set of rate-controlled mobile stations if a targeted reverse link loading cannot be substantially maintained by broadcasting the rate control; and
maintaining an activity factor for each mobile station in the plurality of mobile stations that indicates its membership time in the set of rate-controlled mobile stations.

19. The method of claim 18, wherein assigning selected ones in a plurality of mobile stations as members in a set of rate-controlled mobile stations comprises determining a minimum number of mobile stations to achieve the targeted reverse link loading and thereby minimize the number of mobile stations simultaneously transmitting on the reverse link.

20. The method of claim 19, wherein determining a minimum number of mobile stations to achieve the targeted reverse link loading and thereby minimize the number of mobile stations simultaneously transmitting on the reverse link comprises ranking mobile stations according to a throughput metric and selecting individual ones of them in rank order for assignment to the set of rate-controlled mobile stations until a projected reverse link loading of the selected mobile stations is substantially at the targeted reverse link loading.

21. The method of claim 18, wherein assigning selected ones in a plurality of mobile stations as members in a set of rate-controlled mobile stations comprises sending assignment messages to each of the selected mobile stations to indicate its assignment to the set of rate-controlled mobile stations.

22. The method of claim 21, wherein adjusting membership in the set of rate-controlled mobile stations if a targeted reverse link loading cannot be substantially maintained via the rate control commands comprises at least one of sending assignment messages to one or more currently unassigned mobile stations and sending un-assignment messages to one or more currently assigned mobile stations.

23. The method of claim 18, wherein adjusting membership in the set of rate- controlled mobile stations if a targeted reverse link loading cannot be substantially maintained by broadcasting the rate control commands comprises determining either that the reverse-link data rates of a high fraction of rate-controlled mobile stations are command-limited or are mobile-limited.

24. The method of claim 23, wherein determining either that the reverse-link data rates of a high fraction of rate-controlled mobile stations are command-limited or are mobile-limited comprises:
receiving a status indicator from each rate-controlled mobile station that indicates whether its reverse link data rate currently is command-limited or is mobile-limited; and
evaluating the status indicators.

25. The method of claim 24, wherein evaluating the status indicators comprises determining an average of them.

26. The method of claim 18, further comprising adjusting membership in the set of rate-controlled mobile stations based on a fairness goal.

27. The method of claim 18, further comprising adjusting membership in the set of rate-controlled mobile stations based on a goal of equalizing membership times in the set of rate-controlled mobile stations for all mobile stations in the plurality of mobile stations.

28. The method of claim 18 further comprising controlling membership in the set of rate-controlled mobile stations based on maintaining the activity factor of each mobile station substantially at a target value determined by a user class designation of the mobile station.

29. The method of claim 18 further comprising controlling membership in the set of rate-controlled mobile stations based on maintaining the activity factors of one or more mobile stations at one or more target values determined by Quality-of-Service (QoS) constraints associated with the one or more mobile stations.

30. The method of claim 18 further comprising controlling admissions of new mobile stations to the plurality of mobile stations based on the activity factors.

31. The method of claim 30, wherein controlling admissions of new mobile stations to the plurality of mobile stations based on the activity factors comprises blocking or deferring new mobile stations from admission if an average of the activity factors of the plurality of mobile stations is below a defined threshold.

32. A method of reverse link rate control in a mobile station for use in a wireless communication network, the method comprising:
not responding to the common rate control commands, if in a second mode; and
operating in the first mode or the second mode according to an indication received from the network.

33. The method of claim 32, wherein responding to the rate control commands if in a first mode comprises adjusting a reverse link data rate responsive to the rate control commands.

34. The method of claim 32, wherein not responding to the rate control commands comprises setting a reverse link data rate to a defined minimum rate.

35. The method of claim 33, further comprising, if in the first mode, transmitting status indicators to the network to indicate whether the mobile station is mobile-limited, meaning that it cannot increase its data rate because of one or more conditions at the mobile station, or is command-limited, meaning that it could increase its reverse link data rate but for the common rate control commands indicating that it should not.

36. The method of claim 32 wherein providing feedback to the network indicating whether the reverse link data rate of the mobile station is mobile-limited or command-limited comprises returning a first value to the network to indicate that the mobile station could not increase its reverse link data responsive to receiving an up rate control command from the network.

37. The method of claim 32, wherein providing feedback to the network indicating whether the reverse link data rate of the mobile station is mobile-limited or command-limited comprises returning a second value to the network to indicate that the mobile station could increase its reverse link data responsive to receiving a down or hold rate control command from the network.

38. A base station for use in wireless communication network comprising:
transceiver circuits to send signals to a plurality of mobile stations on a forward link and receive signals from the mobile stations on a reverse link;
processing logic including a load controller configured to generate rate control commands for a first set of mobile stations in the plurality of mobile stations based on a reverse link loading, and further configured to:
receive feedback from each mobile station in the first set indicating whether the reverse link data rate of the mobile station is mobile-limited or is command-limited;
add one or more new members to the first set if the reverse link data rates of more than a first threshold percentage of mobile stations in the first set are mobile-limited; and
subtract one or more current members from the first set if the reverse link data rates of more than a second threshold percentage of mobile stations are command-limited.

39. The base station of claim 38, wherein the load controller is configured to maintain an activity factor for each mobile station in the plurality of mobile stations that indicates its membership time in the first set, and selectively adjust membership in the first set based on a goal of equalizing the activity factors.

40. The base station of claim 39, wherein the load controller is configured to selectively adjust membership in the first set by ranking mobile stations in the first set according to their activity factors and moving one or more highest ranked ones of them out of the first set.

41. The base station of claim 39, wherein the load controller is configured to selectively adjust membership in the first set by ranking mobile stations currently not in the first set according to their activity factors and moving one or more lowest ranked ones of them into the first set.

42. The base station of claim 39, wherein the load controller is configured to selectively adjust membership in the first set by periodically comparing a maximum one of the activity factors for mobile stations in the first set to a minimum one of the activity factors for mobile stations not in the first set, and if the comparison indicates a greater than desired disparity in activity factors, removing the mobile station having the maximum activity factor from the first set, and adding the mobile station having the minimum activity factor to the first set.

43. The base station of claim 38, wherein the load controller is configured to switch one or more mobile stations in the first set with one or more mobile stations not in the first set based on a goal of equalizing an amount of membership time in the first set for all mobile stations.

44. The base station of claim 38, wherein the load controller is configured to receive feedback from each mobile station in the first set based on the base station periodically receiving a status indicator from each mobile station that has a first defined value if the reverse link data rate is mobile-limited, and that has a second defined value if the reverse link data rate is command-limited.

45. The base station of claim 44, wherein the load controller is configured to add one or more new members to the first set if the reverse link data rates of more than a defined fraction of mobile stations in the first set are mobile-limited responsive to determining that an average of the status indicators indicates that the reverse link data rates of a high percentage of mobile stations in the first set are mobile-limited.

46. The base station of claim 44, wherein the load controller is configured to subtract one or more current members from the first set if the reverse link data rates of more than a defined fraction of mobile stations in the first set are command-limited responsive to determining that an average of the status indicators indicates that the reverse link data rates of a high percentage of mobile stations in the first set are command-limited.

47. The base station of claim 44, wherein the load controller is configured to determine whether the status indicators fed back from each mobile station in the first set are a logical "1" value to indicate a mobile-limited status or a logical "0" value to indicate a command-limited status.

48. The base station of claim 38, wherein the load controller is configured to assign a particular mobile station to the first set by causing a first signaling message to be sent from the base station to that particular mobile station, and to remove a particular mobile station from the first set by causing a second signal message to be sent from the base station to that particular mobile station.

49. The base station of claim 38, wherein the load controller is configured to compose the first set of mobile stations based on a goal of achieving a desired reverse link loading with a minimal number of mobile stations in the first set.

50. The base station of claim 40, wherein the load controller is configured to maintain an activity factor for each mobile station in the plurality of mobile stations that indicates its membership time in the first set.

51. The base station of claim 50, wherein the load controller is configured to control membership in the first set based on maintaining the activity factor of each mobile station substantially at a target value determined by a user class designation of the mobile station.

52. The base station of claim 50, wherein the load controller is configured to control membership in the first set based on maintaining the activity factors of one or more mobile stations at one or more target values determined by Quality-of-Service (QoS) constraints associated with the one or more mobile stations.

53. The base station of claim 50, wherein the base station is configured to control admissions of new mobile stations to the plurality of mobile stations based on the activity factors maintained by the load controller.

54. The base station of claim 53, wherein the base station is configured to control admissions of new mobile stations to the plurality of mobile stations based on the activity factors maintained by the load controller based on blocking or deferring new mobile stations from admission if an average of the activity factors of the plurality of mobile stations is below a defined threshold.

* * * * *

UNITED STATES PATENT AND TRADEMARK OFFICE
CERTIFICATE OF CORRECTION

PATENT NO. : 7,466,669 B2
APPLICATION NO. : 10/713763
DATED : December 16, 2008
INVENTOR(S) : Hosein It is certified that error appears in the above-identified patent and that said Letters Patent is hereby corrected as shown below:

In Column 12, Line 29, in Claim 18, delete "control;" and insert -- control commands; --, therefor.

In Column 13, Line 23, in Claim 28, delete "18" and insert -- 18, --, therefor.

In Column 13, Line 28, in Claim 29, delete "18" and insert -- 18, --, therefor.

In Column 13, Line 34, in Claim 30, delete "18" and insert -- 18, --, therefor.

In Column 13, between Line 45 & 46, in Claim 32, insert -- responding to common rate control commands broadcast by a base station serving the mobile station and providing feedback to the network indicating whether the reverse link data rate of the mobile station is mobile-limited or command-limited, if in a first mode; --.

In Column 13, Line 57, in Claim 35, delete "claim 33," and insert -- claim 32, --, therefor.

In Column 13, Line 65, in Claim 36, delete "32" and insert -- 32, --, therefor.

Signed and Sealed this

Twenty-seventh Day of October, 2009

David J. Kappos
*Director of the United States Patent and Trademark Office*